(12) United States Patent
Yamauchi

(10) Patent No.: US 7,367,040 B2
(45) Date of Patent: Apr. 29, 2008

(54) VIEW RESTRICTION METHOD, VIEW RESTRICTION SETTING METHOD, RECEIVER, AND DEVICE AND PROGRAMS FOR SETTING VIEW RESTRICTION

(75) Inventor: Atsushi Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1326 days.

(21) Appl. No.: 10/067,238

(22) Filed: Feb. 7, 2002

(65) Prior Publication Data
US 2003/0046100 A1 Mar. 6, 2003

(30) Foreign Application Priority Data
Aug. 29, 2001 (JP) ............... 2001-259264

(51) Int. Cl.
H04N 7/16 (2006.01)
H04N 7/08 (2006.01)
(52) U.S. Cl. ............... 725/28; 725/25; 725/30; 725/137; 725/136
(58) Field of Classification Search ........... 725/25–30; 380/230–242
See application file for complete search history.

(56) References Cited

U.S. PATENT DOCUMENTS

| 4,890,321 | A | * | 12/1989 | Seth-Smith et al. | 380/231 |
| 4,987,486 | A | * | 1/1991 | Johnson et al. | 725/131 |
| 5,699,104 | A | * | 12/1997 | Yoshinobu | 725/27 |
| 6,163,272 | A | * | 12/2000 | Goode et al. | 725/30 |
| 6,212,679 | B1 | * | 4/2001 | Vornsand | 725/25 |
| 6,334,216 | B1 | * | 12/2001 | Barth | 725/30 |
| 6,360,367 | B1 | * | 3/2002 | Yamamoto | 725/25 |
| 6,732,367 | B1 | * | 5/2004 | Ellis et al. | 725/27 |
| 7,092,729 | B1 | * | 8/2006 | Fichet et al. | 455/466 |

FOREIGN PATENT DOCUMENTS

JP 10-341425 12/1998

OTHER PUBLICATIONS

Hyde, P. A, "The Conditional Access System", UK Direct Broadcast, IEE Colloquium, Jan. 26, 1989.*
JP 10-341425 English Translation.*
Japanese Office Action issued Oct. 3, 2006 in corresponding Japanese Application No. 2001-259264.

* cited by examiner

*Primary Examiner*—Scott E. Beliveau
*Assistant Examiner*—Usha Raman
(74) *Attorney, Agent, or Firm*—Staas & Halsey LLP

(57) ABSTRACT

A view restriction method surely blocks a program voluntarily designated by a viewer from view. When a restricted program is designated by the viewer (step S1), receiver identification information for identifying a receiver of a viewer is associated with the restricted program (step S2). View restriction information is broadcasted together with the restricted program in a broadcasting time range of the restricted program (step S3). At the receiver, the view restriction information is captured (step S4). At the receiver, display of the restricted program is restricted if the receiver identification information included in the view restriction information matches that set at the receiver (step S5).

1 Claim, 17 Drawing Sheets

111 INFORMATION ABOUT PROGRAM SUBJECT TO RESTRICTION

| DATA ITEM | SOURCE |
|---|---|
| STREAM IDENTIFICATION DESCRIPTOR | ALL-STATIONS EPG DATA (SERVICE INFORMATION) |
| NETWORK NAME DESCRIPTOR | ALL-STATIONS EPG DATA (SERVICE INFORMATION) |
| SYSTEM MANAGEMENT DESCRIPTOR | ALL-STATIONS EPG DATA (SERVICE INFORMATION) |
| SERVICE LIST DESCRIPTOR | ALL-STATIONS EPG DATA (SERVICE INFORMATION) |
| SATELLITE DISTRIBUTION SYSTEM DESCRIPTOR | ALL-STATIONS EPG DATA (SERVICE INFORMATION) |
| SERVICE DESCRIPTOR | ALL-STATIONS EPG DATA (SERVICE INFORMATION) |
| BROADCASTER NAME DESCRIPTOR | ALL-STATIONS EPG DATA (SERVICE INFORMATION) |
| RECTANGULAR EVENT DESCRIPTOR | ALL-STATIONS EPG DATA (SERVICE INFORMATION) |
| COMPONENT DESCRIPTOR | ALL-STATIONS EPG DATA (SERVICE INFORMATION) |
| AUDIO COMPONENT DESCRIPTOR | ALL-STATIONS EPG DATA (SERVICE INFORMATION) |

FIG. 10

| DATA ITEM | SOURCE |
|---|---|
| IC CARD ID OF RECEIVER | ID OF IC CARD LOADED TO RECEIVER |
| STREAM IDENTIFICATION DESCRIPTOR | ALL-STATIONS EPG DATA (SERVICE INFORMATION) |
| NETWORK NAME DESCRIPTOR | ALL-STATIONS EPG DATA (SERVICE INFORMATION) |
| SYSTEM MANAGEMENT DESCRIPTOR | ALL-STATIONS EPG DATA (SERVICE INFORMATION) |
| SERVICE LIST DESCRIPTOR | ALL-STATIONS EPG DATA (SERVICE INFORMATION) |
| SATELLITE DISTRIBUTION SYSTEM DESCRIPTOR | ALL-STATIONS EPG DATA (SERVICE INFORMATION) |
| SERVICE DESCRIPTOR | ALL-STATIONS EPG DATA (SERVICE INFORMATION) |
| BROADCASTER NAME DESCRIPTOR | ALL-STATIONS EPG DATA (SERVICE INFORMATION) |
| RECTANGULAR EVENT DESCRIPTOR | ALL-STATIONS EPG DATA (SERVICE INFORMATION) |
| COMPONENT DESCRIPTOR | ALL-STATIONS EPG DATA (SERVICE INFORMATION) |
| AUDIO COMPONENT DESCRIPTOR | ALL-STATIONS EPG DATA (SERVICE INFORMATION) |
| FIXED-FORM MESSAGE NUMBER | SELECTED FIXED-FORM MESSAGE NUMBER |
| MESSAGE DIFFERENCE INFORMATION | PHRASE AND SENTENCE INPUT TO CHANGEABLE PART OF FIXED-FORM MESSAGE |
| 112 | INDIVIDUAL VIEW RESTRICTION INFORMATION |

FIG. 12

113 EMM DATA

| DATA ITEM | CONTENT | BYTES |
|---|---|---|
| CARD ID | ID OF IC CARD LOADED TO RECEIVER | 6 |
| PAY BUSINESS UNIT IDENTIFICATION CODE | CODE FOR IDENTIFYING BUSINESS UNIT ON PAY BROADCASTING OPERATION | 1 |
| MESSAGE ID | ID OF MESSAGE | 1 |
| FIXED-FORM MESSAGE NUMBER | SELECTED FIXED-FORM MESSAGE NUMBER | 2 |
| MESSAGE DIFFERENCE INFORMATION | PHRASE AND SENTENCE INPUT TO CHANGEABLE PART OF FIXED-FORM MESSAGE | N |

114 PROGRAM DESIGNATING DATA

| DATA ITEM | SOURCE |
|---|---|
| STREAM IDENTIFICATION DESCRIPTOR | ALL-STATIONS EPG DATA (SERVICE INFORMATION) |
| NETWORK NAME DESCRIPTOR | ALL-STATIONS EPG DATA (SERVICE INFORMATION) |
| SYSTEM MANAGEMENT DESCRIPTOR | ALL-STATIONS EPG DATA (SERVICE INFORMATION) |
| SERVICE LIST DESCRIPTOR | ALL-STATIONS EPG DATA (SERVICE INFORMATION) |
| SATELLITE DISTRIBUTION SYSTEM DESCRIPTOR | ALL-STATIONS EPG DATA (SERVICE INFORMATION) |
| SERVICE DESCRIPTOR | ALL-STATIONS EPG DATA (SERVICE INFORMATION) |
| BROADCASTER NAME DESCRIPTOR | ALL-STATIONS EPG DATA (SERVICE INFORMATION) |
| RECTANGULAR EVENT DESCRIPTOR | ALL-STATIONS EPG DATA (SERVICE INFORMATION) |
| COMPONENT DESCRIPTOR | ALL-STATIONS EPG DATA (SERVICE INFORMATION) |
| AUDIO COMPONENT DESCRIPTOR | ALL-STATIONS EPG DATA (SERVICE INFORMATION) |

FIG. 15

| DATA ITEM | CONTENT | BYTES |
|---|---|---|
| CARD ID | ID OF IC CARD LOADED TO RECEIVER | 6 |
| MESSAGE BYTE LENGTH | BYTE LENGTH FROM PROTOCOL NUMBER TO THE LAST OF MESSAGE CODE FIELD | 2 |
| PROTOCOL NUMBER | VALUE OTHER THAN 0xFF (NO ENCRYPT) | 1 |
| PAY BUSINESS UNIT IDENTIFICATION CODE | CODE FOR IDENTIFYING BUSINESS UNIT ON PAY BROADCASTING OPERATION | 1 |
| MESSAGE ID | ID OF MESSAGE | 1 |
| MESSAGE CONTROL INFORMATION | 0x00 (="STORED IN IC CARD ") | 1 |
| TAMPER-PROOF CHECK OR SPARE | SPECIFY TYPE STREAM FOR TAMPER CHECK | 2 |
| EXPIRATION DATE OR SPARE | END DATE OF PROGRAM | 2 |
| FIXED-FORM MESSAGE NUMBER | FIXED-FORM MESSAGE NUMBER | 2 |
| DIFFERENCE FORMAT NUMBER | DESCRIPTION FORMAT NUMBER OF DIFFERENCE INFORMATION | 1 |
| DIFFERENCE INFORMATION LENGTH | BYTE LENGTH OF DIFFERENCE INFORMATION | 2 |
| DIFFERENCE INFORMATION | MESSAGE DIFFERENCE INFORMATION | N |
| STUFFING | STUFFING BIT | M |

115 — EMM INDIVIDUAL MESSAGE

116 EMM COMMON MESSAGE

| DATA ITEM | CONTENT | BYTES |
|---|---|---|
| PAY BUSINESS UNIT IDENTIFICATION CODE | CODE FOR IDENTIFYING BUSINESS UNIT ON PAY BROADCASTING OPERATION | 1 |
| AUTOMATIC DISPLAY DELETION TYPE | 0x01(="DELETION IS NOT ALLOWED") | 1 |
| AUTOMATIC DISPLAY CONTINUOUS TIME 1 | 0xFF(="NO LIMIT") | 1 |
| AUTOMATIC DISPLAY CONTINUOUS TIME 2 | — | 1 |
| AUTOMATIC DISPLAY CONTINUOUS TIME 3 | — | 1 |
| AUTOMATIC DISPLAY TIMES | "1" | 1 |
| FORMAT NUMBER | FORMAT OF MESSAGE CODE BODY | 1 |
| MESSAGE LENGTH | BYTE LENGTH OF MESSAGE CODE | 2 |
| MESSAGE CODE BODY | FIXED-FORM SENTENCE | L |

FIG. 16

VIEW RESTRICTION METHOD, VIEW RESTRICTION SETTING METHOD, RECEIVER, AND DEVICE AND PROGRAMS FOR SETTING VIEW RESTRICTION

BACKGROUND OF THE INVENTION (1) Field of the Invention

The present invention relates to a view restriction method, a view restriction setting method, a receiver and a device and a program for setting view restriction. More particularly, the present invention relates to a scheme of restricting view of programs on the basis of the contents thereof.

(2) Description of the Related Art

Recently, the necessity of view restriction based on the contents of TV programs has been pointed out because violent and obscene programs are prejudicial to children. A technique has been developed in which television sets are equipped with a particular device capable of automatically blocking specific video programs that may be prejudicial to children, such as violent scene and excessive sex depiction. Such view restriction is implemented by, for example, a so-called V-chip (Violence chip).

The V-chip has a blocking mechanism in which the broadcasting station rates each program based on the degree of violence or obscene, and translates the rating value thus obtained into a corresponding signal, which is then broadcasted in the form of radio wave. If the television set equipped with the V-chip of blocking violent scene detects a rating value equal to or greater than the threshold value, it automatically prevents the corresponding video from view.

This makes it possible to protect the TV viewer of under the specified age from a detrimental program. Presently, the use of V-chip has been mandated in digital broadcasting in the United States and Canada. The V-chip technique allows the setting of blocking violent programs to be released to view such programs by inputting the password into the TV set.

A program-selecting function called VPS (Video Program System) is known as a technique similar to the V-chip. According to VPS, the broadcasting station restricts the allowable program contents on the broadcast time range. When a program content adverse to the time range based restriction is broadcasted, the broadcasting station superposes a signal indicating out-of-restriction on the broadcasting wave of the program.

The receiver compatible with the VPS receives the signal indicating whether the associated program is adverse to the time range based restriction, and recognizes that the broadcasted program easily ruins children's corporal, mental and emotional healthy. Then, the receiver blocks the program from view. However, if the password consisting of four digits is applied to the receiver, the blocking is disabled. At present, the VPS is mandated in some states in Germany.

The use of V-chip or VPS has not yet been mandated in the digital broadcasting in Japan for several reasons. However, the rating value may be assigned to each program. If the TV viewer sets a parental password (parental lock) in his/her receiver, a specified rated program will be placed out of view.

It is to be noted that the rating in the conventional view restriction method using the V-chip or VPS is based on the uniform standard. This does not allow the parents to block a program that does not contain violent scene or obscene scene but is prejudicial to children from an educational or moral viewpoint.

In addition, the V-chip or VPS allows the blocking to be easily released due to leakage of the parental password. This makes it difficult to surely protect children from unwanted programs.

SUMMARY OF THE INVENTION

Taking the above into consideration, an object of the present invention is to provide a view restriction method, a view restriction setting method, a receiver and a device and a program for setting view restriction capable of surely blocking a program voluntarily designated by a viewer from view.

The above object of the present invention is achieved by a view restriction method for imposing view restriction on a program that is scheduled to be broadcasted or being broadcasted, comprising the steps of: associating receiver identification information for identifying a receiver of a viewer with a restricted program when the restricted program is designated by the viewer; broadcasting view restriction information including the receiver identification information associated with the restricted program together with the restricted program in a broadcasting time range of the restricted program; acquiring, at the receiver, the view restriction information broadcasted together with the restricted program; and restricting, at the receiver, display of the restricted program if the receiver identification information included in the view restriction information matches that set at the receiver.

The above object of the present invention is also achieved by a view restriction setting method for setting view restriction comprising the steps of: associating receiver identification information for identifying a receiver of a viewer with a restricted program when the restricted program is designated by the viewer; and transmitting the receiver identification information and information about the restricted program to a broadcasting service provider that broadcasts the restricted program.

The above-mentioned object of the present invention is also achieved by a receiver capable of imposing view restriction of a program that is scheduled to be broadcasted or being broadcasted, comprising: acquiring means for acquiring view restriction information that is broadcasted together with the restricted program; and display control means for restricting display of the restricted program if receiver identification information included in the view restriction information matches that set at the receiver.

The above-mentioned object of the present invention is also achieved by a view restriction setting device for setting view restriction, comprising: associating means for associating receiver identification information for identifying a receiver of a viewer with a restricted program when the restricted program is designated by the viewer; and transmission means for transmitting the receiver identification information and information about the restricted program to a broadcasting service provider that broadcasts the restricted program.

The above-mentioned object of the present invention is also achieved by a view restriction setting program for causing a computer to execute processing for setting view restriction comprising: associating receiver identification information for identifying a receiver of a viewer with a restricted program when the restricted program is designated by the viewer; and transmitting the receiver identification information and information about the restricted program to a broadcasting service provider that broadcasts the restricted program.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 is a view of information about a restricted program acquired in a program selection process;

FIG. 12 is a view of an example of individual view restriction information transmitted to the viewer protection business unit from the receiver;

FIG. 13 is a view of an example of EMM data;

FIG. 14 is a view of an example of program specifying data;

FIG. 15 is a view of an EMM individual message;

FIG. 16 is a view of an EMM common message; and

DESCRIPTION OF THE PREFERRED EMBODIMENTS

Hereinafter, embodiments of the present invention will be described with reference to the accompanying drawings.

Figure 1:
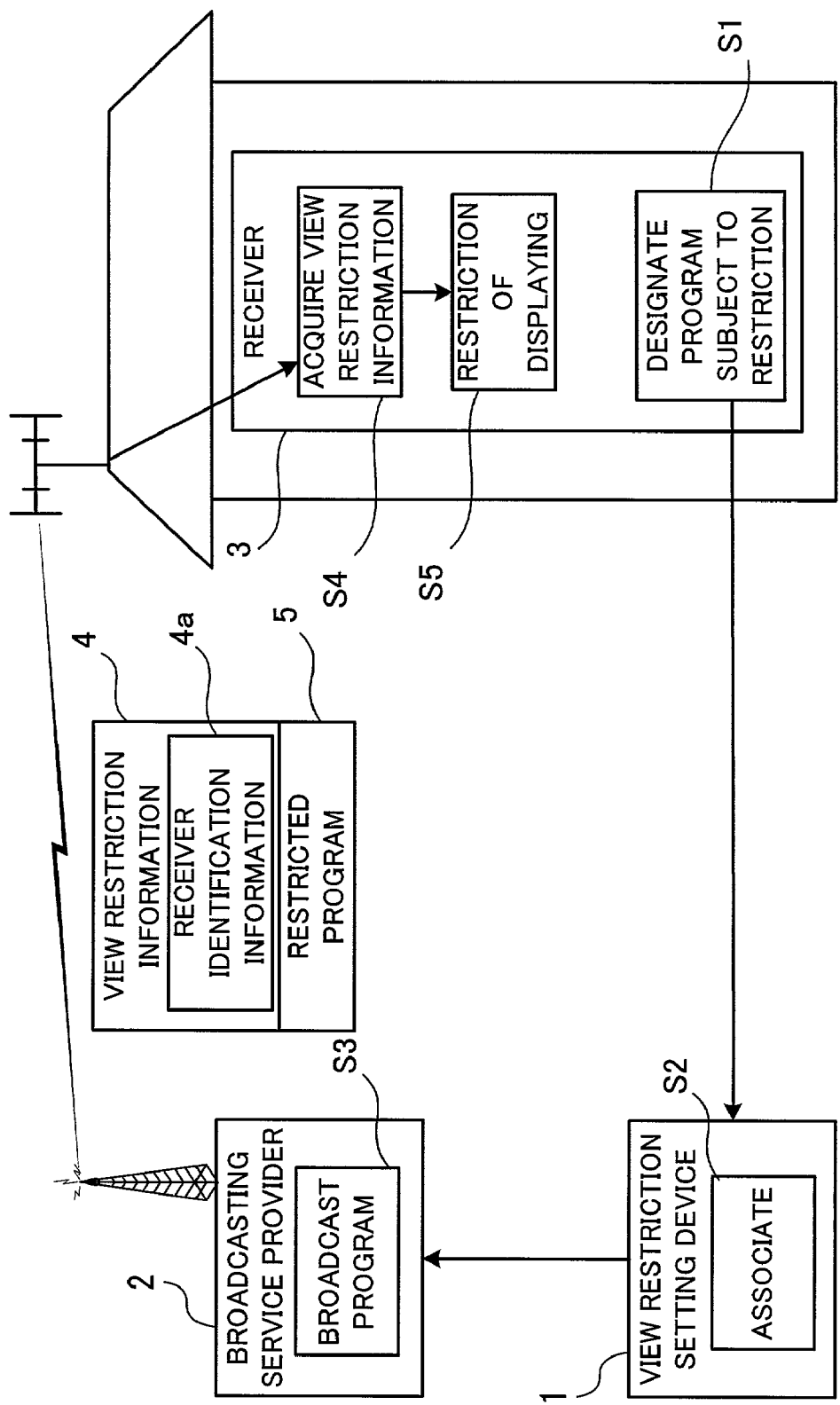
FIG. 1 is a block diagram of the principles of the present invention.

FIG. 1 is a block diagram illustrating the principles of the present invention. The present invention is capable of restricting view of programs to be broadcasted or those being broadcasted as follows. A viewer designates a restricted program 5 that is to be restricted from view (step S1). Next, receiver identification information 4a for identifying a receiver 3 used by the viewer and the designated restricted program 5 are transmitted to a broadcasting service provider 2 in association with each other (step S2). The associating of the information 4a and the program 5 is done in, for example, a view restriction setting device 1. In this case, if a communication medium such as a telephone line is used to connect the receiver 3 and the device 1, the designated content of the restricted program 5 and the receiver identification information 4a of the receiver 3 can be sent to the view restriction setting device 1 from the receiver 3.

Then, view restriction information 4 containing the receiver identification information 4a is broadcasted together with the restricted program 5 in the broadcasting time range of the program 5 (step S3). The restricted program 5 and the view restriction information 4 are broadcasted by, for example, the broadcasting service provider 2 that receives the information 4 from the device 1.

In the receiver 3, the view restriction information 4 broadcasted together with the restricted program 5 is captured (step S4). If the captured information 4 contains the same receiver identification information 4a as that in its own device, the receiver 3 restricts displaying of the restricted program 5 (step S5). For example, restriction of displaying is implemented by preventing the program 5 to be displayed (blocking).

If the viewer designates the restricted program 5 beforehand, the view restriction information 4 is broadcasted together with the restricted program 5. Since the view restriction information 4 contains the receiver identification information 4a, the receiver 3 restricts displaying of the program 5 if the same information 4a as that in the receiver 3 is received.

In that manner, view of the program designated by the viewer can be restricted in the receiver 3 used by the viewer. In addition, since a decision on view restriction has been made by the viewer, there is no need to provide the function of releasing the view restriction using the password. It is thus possible to prevent children from viewing the view-restricted program due to leakage of password.

An individual message that is voluntarily specified by the viewer may be contained in the view restriction information 4 at the time of creation of the information 4. The receiver, which received the view restriction information 4, displays the individual message contained in the view restriction information 4 instead of the screen of the restricted program at the time of restriction of displaying the restricted program.

This makes it possible to display the personal message to the child from the parents when the child attempts to watch the restricted program designated by the parents. The individual message may teach the child and may be useful to child discipline at the viewer's home.

The rating value dependent on the content of the restricted program may be associated with the restricted program at the time of broadcasting the restricted program. In this case, if the receiver 3 receives a restricted program with a rating value equal to or higher than the predetermined rating value, a screen for entering the password (parental password) appears. If the predetermined parental password is entered correctly, the individual message contained in the view restriction information 4 is displayed instead of the screen of the restricted program.

The individual message may be displayed only when the child is aware of the program that is barred to him or her and attempts to view it without his/her parents' knowledge. That is, when the child who is selecting a program does not have any intention of viewing the restricted program, only the screen for entering the password is displayed even if the corresponding channel is tuned. This makes it possible to avoid a possibility that the child who does not intend to view the restricted program may be scolded by the individual message.

Figure 2:
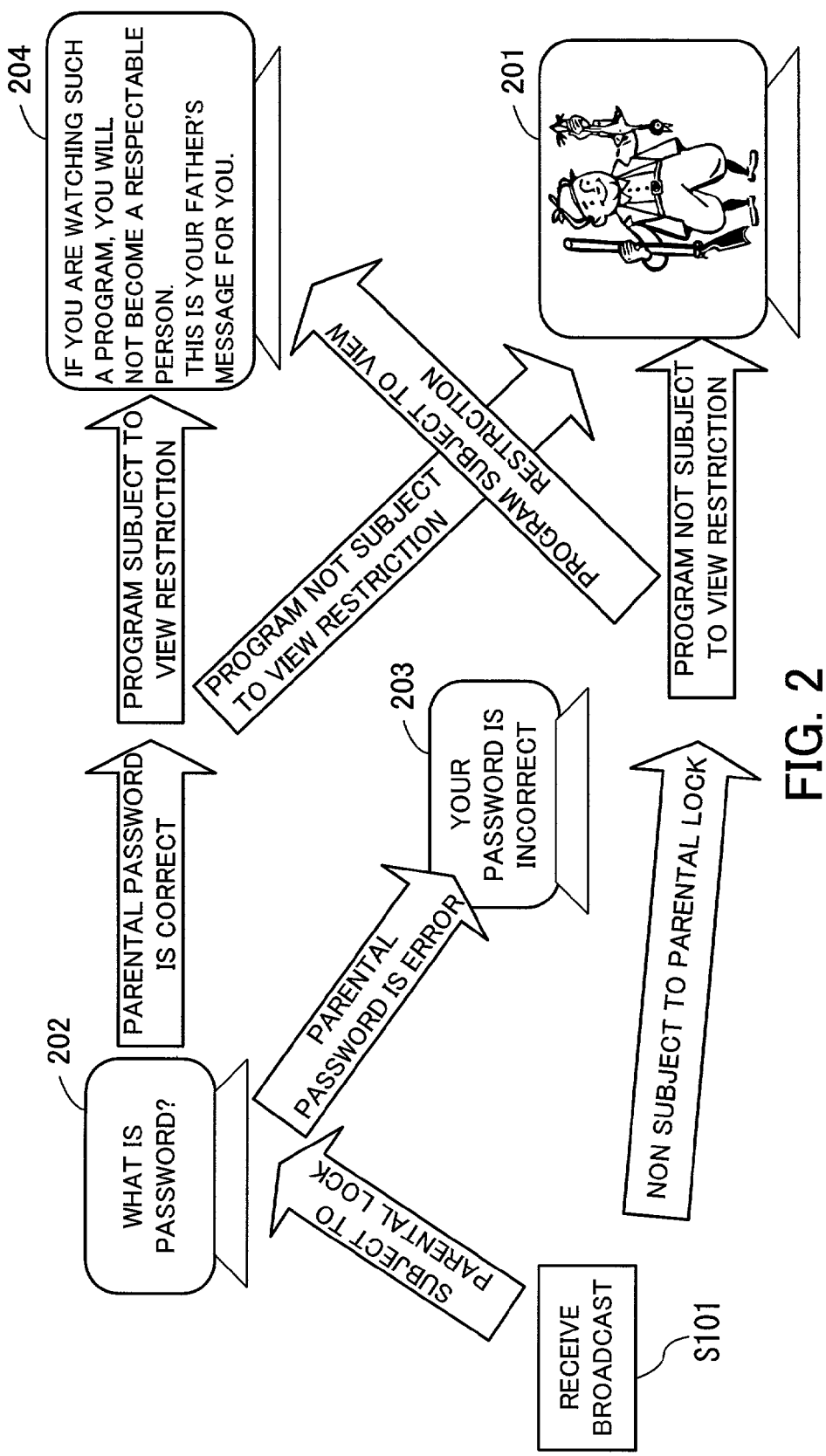
FIG. 2 is a view of a screen transition displayed on a monitor of a receiver.

FIG. 2 is a view of a screen transition displayed on a monitor of the receiver. The receiver 3 receives a broadcast (step S101), and compares the rating value of the received program with the rating value preset in the receiver 3 to determine whether the program is subject to the parental lock. If the program is not subject to the parental lock, it is determined whether the program is subject to restriction that is voluntarily designated. If not, a screen 201 of the program appears. In contrast, if the program is subject to restriction (view-restricted program), a message preset by the viewer is displayed on an individual message screen 204.

If the program is subject to the parental lock, a password enter screen 202 appears. If the entered parental password is incorrect, an error message screen 203 appears. For example, a message such that "your password is incorrect" is displayed on the error message screen 203. If the entered parental password is correct, it is determined whether the program is the view-restricted program voluntarily designated. If the program is not the view-restricted program voluntarily designated (non view-restricted program), the screen 201 of the program appears. If the program is subject to view restriction, the individual message screen 204 for the preset message appears. For example, a message such that "If you are watching such a program, you will not become a respectable person. This is your father's message for you".

The present invention needs broadcasting means for sending an individual message to each home. A technique of limited receiving may be applied to the broadcasting means. In the limited receiving, only specific viewers are allowed to receive programs. For example, this has been utilized as a scheme such that only the persons who pay the service fee can receive the pay programs.

In the existing receiving scheme, the signal of the designated program is scrambled, and is viewable at only the receivers that have a key for descrambling. The limited receiving in digital broadcasting in Japan employs "master key" and "work key" that are unique to the individual receivers, and "scramble key" that is common to all the receivers.

Figure 3:
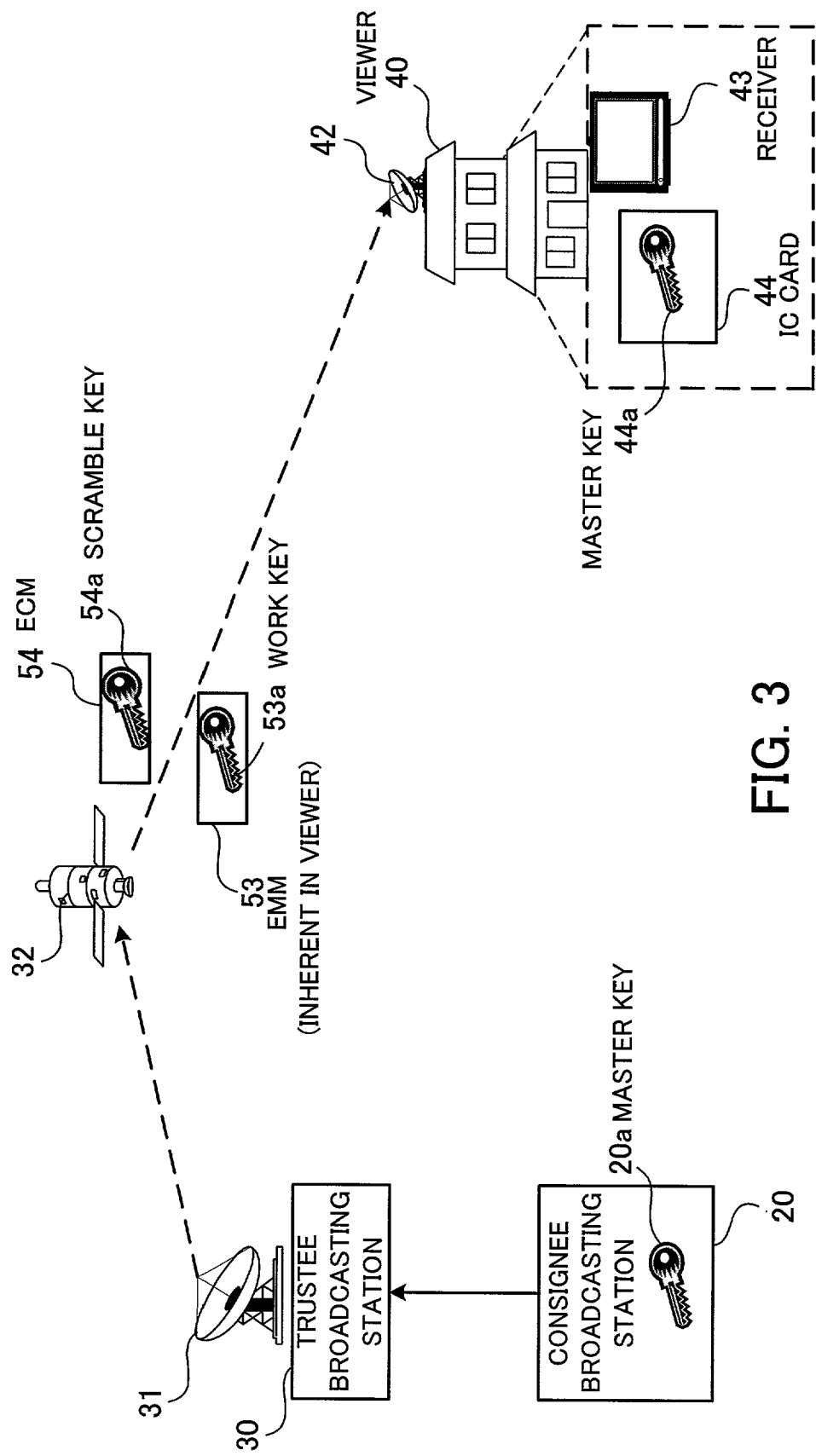
FIG. 3 is a view of the concept of implementation of limited receiving.

FIG. 3 is a view illustrating the concept of the limited receiving. In the example of FIG. 3, the broadcaster is a consignee broadcasting station 20. As shown in FIG. 3, the consignee broadcasting station 20 that delivers satellite broadcasting programs has a master key 20*a*, and sends image data containing individual information (EMM: Entitlement Management Message) 53 and common information (ECM: Entitlement Control Message) 54 to the consignee broadcasting station 30. Then, the consignee broadcasting station 30 superposes the EMM 53 and the ECM 54 on the broadcasting wave emitted via an antenna 31. The broadcasting wave thus obtained is sent via a satellite 32.

The EMM 53 is information inherent in the viewer and a plurality of EMMs based on the number of viewers are superposed on the broadcasting wave. A work key 53*a* is included in the EMM 53. A scramble key 54*a* is included in the ECM 54.

A viewer 40 receives the broadcasting via the satellite 32 at a receiver 43 via an antenna 42. The receiver 43 may, for example, be a television set, a video deck or a BS (Broadcasting Satellite) tuner.

The viewer 40 has an IC (Integrated Circuit) card 44, which can be loaded to the receiver 43. A master key 44*a* for information decoding is stored in the IC card 44. The master key 44*a* is data that has the same content as that of the master key 20*a* owned by the consignee broadcasting station 20. The IC card 44 may, for example, "B-CAS card" (issued by BS Conditional Access Systems (B-CAS)).

In the limited receiving system described above, the consignee broadcasting station 20 scrambles broadcasting program data (image data and sound data) by use of the scramble key 54*a*. Then, the consignee broadcasting station 20 uses the work key 53*a* to encrypt the program information and the scramble key 54*a*. The encrypted information is multiplexed into the scrambled program data as ECM 54. The work key 53*a* is encrypted by the master key 20*a* together with contract information about each audience. The encrypted contract information and the work key 53*a* are multiplexed, as EMM 53, into the scrambled program data (into which ECM has been multiplexed). The program data with the EMM 53 multiplexed is passed from the consignee broadcasting station 20 to a trustee broadcasting station 30, which broadcasts the wave to the viewer 40.

The viewer 40 loads the IC card 44 to the receiver 43. The receiver 43 receives the broadcasting wave from the satellite 32, and separates it into the program data (into which the ECM has been multiplexed) and the EMM 53. The receiver 43 extracts the master key 44*a* from the IC card 44, and retrieves the EMM 53 by using the master key 44*a* for the decoding key. Thus, the work key 53*a* and the contract information are extracted. Next, the receiver 43 separates the ECM 54 from the program data (into which the ECM has been multiplexed). The receiver 43 retrieves the ECM 54 by using the work key 53*a* as the decoding key. Thus, the scramble key 54*a* and the program information are extracted. The receiver 43 compares the program information with the contract information extracted in advance, and descrambles the program data using the scramble key 54*a* as the descramble key if the program is one of the contracted programs. Thus, the data of the viewable program is extracted and the screen is regenerated at the receiver 43.

In the digital broadcasting in Japan, a message is stored in a specific field of the EMM 53, so that an automatically displayed, receiver-specific message can be delivered using the broadcasting wave. If the message is displayed on the screen, the message might disturb comfortable viewing. The NHK utilizes the above to remind the audiences of the payment of the outstanding viewing fee. The message inherent in each viewer according to the present invention may be contained in the EMM 53. If information about programs that are restricted from view is contained in the EMM, a message inherent in the viewer 40 with regard to a program may be displayed.

If the viewer 40 chooses a view-restricted program, the viewer 40 is needed to have the program schedule table in advance. According to the operating prescription of Japanese BS digital broadcasting, service information (SI) about the programs scheduled to be broadcasted (program arrangement information) is collected at an SI collection and delivery center at which channel information and program information about all broadcasting stations are collected. The viewer 40 can access, as an EPG (Electric Program Guide) of all stations, information about broadcast scheduled programs for the coming couple of days at the receiver 43 at home.

In order to expand the limited receiving system and apply the present invention to the expanded system, the consignee station 20 or a third party business unit (for instance, a viewer protection business unit) is designed to include the message input from the viewer 40 in the EMM 53.

In this case, if the viewer 40 sees the EPG of all the stations and finds a program which the viewer 40 does not want to display at his/her home receiver 43, the viewer 40 accesses the viewer protection business unit (or broadcasting station directly) in advance of broadcasting the program by means of communication means embedded in the receiver 43. Then, the viewer 40 asks the business unit or the broadcasting station to have the screen automatically full of inerasable messages to prevent somebody who attempts to view the program using the receiver 43 at home from viewing the program. In the viewer protection business unit, the EMM signal to the home receiver 43 of the viewer 40 is created and edited, so that the involved program can surely be blocked so as to meet the viewer's wishes.

Further, by combining the present invention and the parental lock (for example, V-chip), the transmission side can be equipped with a mechanism for disabling the viewer to view the program designated by the viewer in advance in addition to the blocking mechanism on the receiver side. The unwanted program can more surely be blocked.

Therefore, even if the V-chip embedded in the receiver fails to operate normally due to a certain factor or if the parental lock is released due to leakage of the parental password, the automatic displayed message appears on the whole screen for the program on which the view restriction is imposed by the viewer 40. Therefore, the subject program cannot be viewed at all.

Now, a description will be given of an embodiment of the present invention in which both the individually designated view restriction and the parental lock are combined (double blocking) using a satellite.

Figure 4:
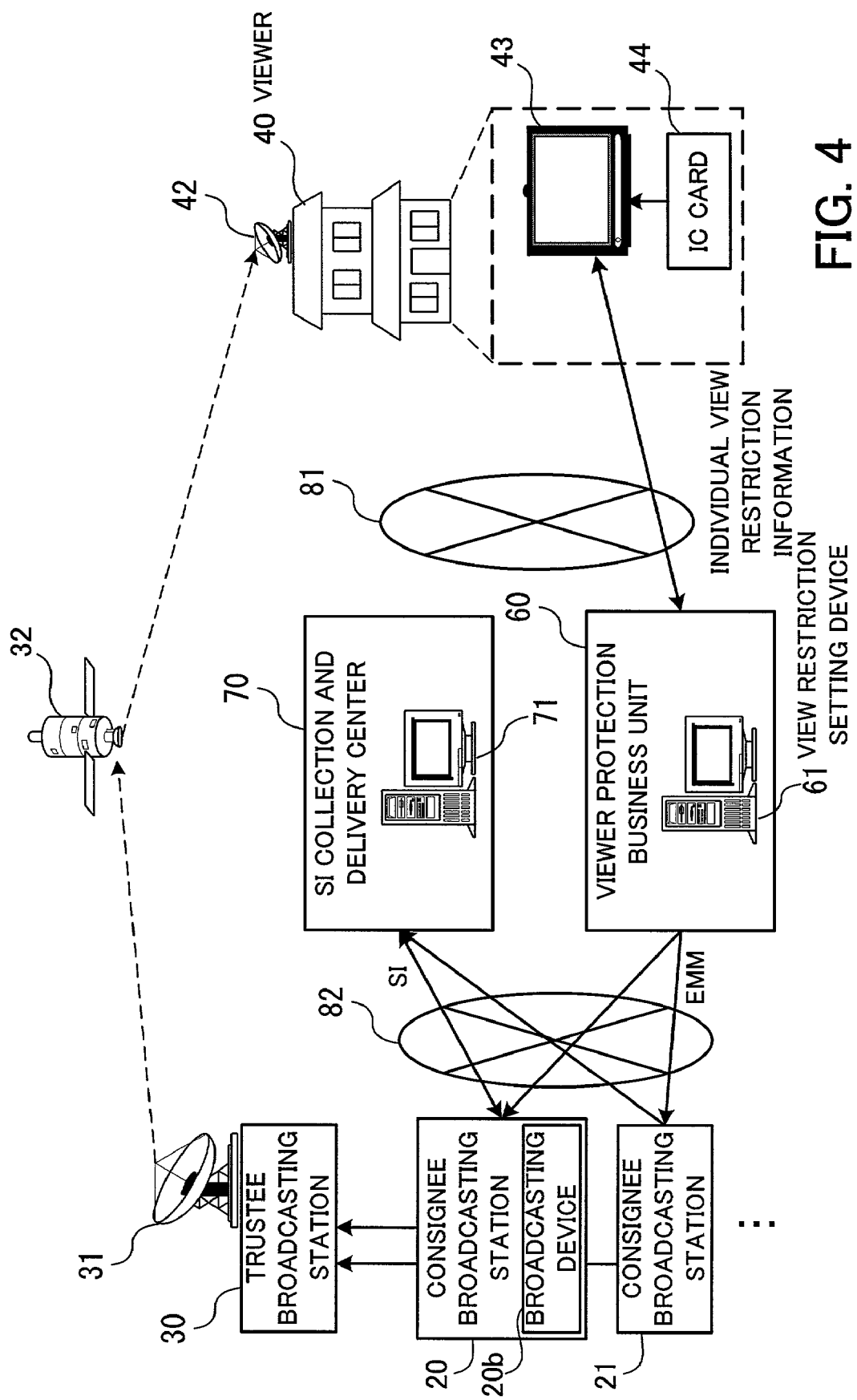
FIG. 4 is a diagram of a system structure for realizing an embodiment of the present invention.

FIG. 4 is a block diagram of a system structure for carrying out the present invention. In the system in FIG. 4, a viewer protection business unit 60 and an SI collection and delivery center 70 are added to the structure shown in FIG. 3.

The viewer protection business unit 60 has a view restriction setting device 61. A network 81 is interposed between the view restriction setting device 61 and the receiver 43 owned by the viewer 40. A network 82 is interposed between the view restriction setting device 61 and the broadcasting device 20b installed in the consignee broadcasting station 20. The networks 81 and 82 may, for example, be public telephone lines or dedicated digital lines.

The SI collection and delivery center 70 has a server computer 71 as in the case of the viewer protection business unit 60. The server computer 71 is connected to the receiver 43 via the network 81, and is connected to consignee broadcasting stations 20, 21, . . . via the network 82.

The viewer protection business unit 60 is a third party organization that provides service of including the message input from the viewer 40 in the EMM 53. The viewer protection business unit 60 receives, via the view restriction setting device 61, individual view restriction information including the individual message for display from the receiver 43 of the viewer 40. The view restriction setting device 61 creates EMM data including the individual message, and passes the EMM data thus created to the broadcasting devices 20b of the consignee broadcasting stations 20, 21, and so on.

The SI collection and delivery center 70 uses the server computer 71 to collect the SI from the consignee broadcasting stations 20, 21, . . . and create all-stations EPG data, which is sent back to the consignee broadcasting stations 20, 21, . . . . The all-stations EPG data are superposed on the broadcasting waves that are sent to the viewer 40 from the stations 20, 21, . . . , so that the receiver 43 of the viewer 40 receives the all-stations EPG.

Next, a description will be given, with reference to FIGS. 5 through 7, of the structural elements of the system shown in FIG. 4.

Figure 5:
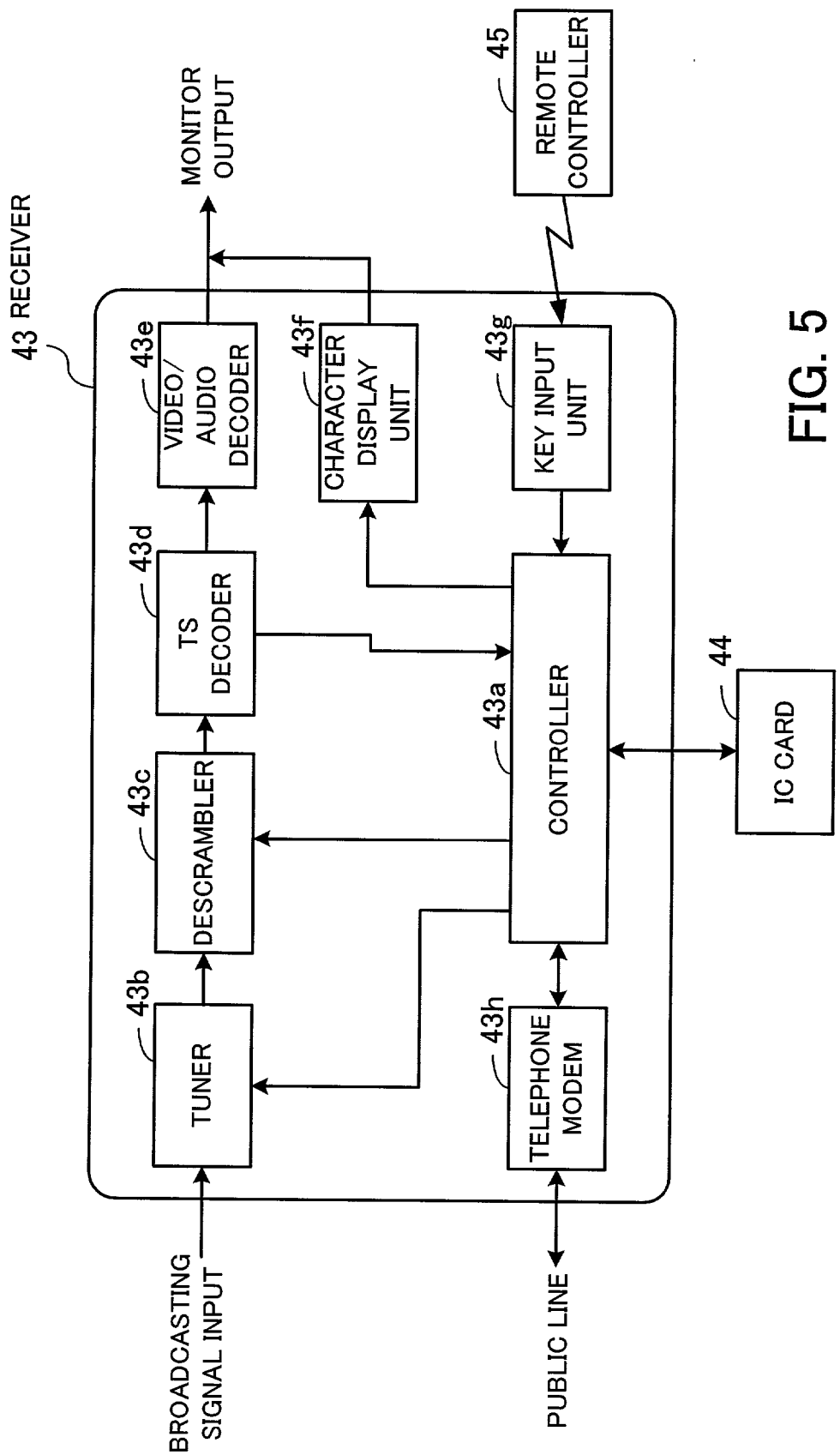
FIG. 5 is a functional block diagram of a receiver.

FIG. 5 is a functional block diagram of the receiver 43. As shown, the entire operation of the receiver 43 is controlled by a controller 43a, to which are connected a tuner 43b, a descrambler 43c, a TS (Transport Stream) decoder 43d, a video/audio decoder 43e, a character display unit 43f, a key input unit 43g and a telephone modem 43h.

The tuner 43b receives the broadcasting signal obtained via the antenna 42. The channel (frequency) to be received is specified by the controller 43a.

The descrambler 43c descrambles the broadcasting signal received via the tuner 43b by using the descramble key. More particularly, as has been described with reference to FIG. 3, the controller 43a uses the master key 44a stored in the IC card 44 and separates the EMM 53 and the ECM 54 from the broadcasting signal, whereby the scramble key 54a can be acquired. The scramble key 54a is passed to the descrambler 43c, which descrambles the received broadcasting signal.

The TS decoder 43d decodes the broadcasting signal having a TS format. The TS is a transmission formation of a multiplexing stream used in the multi-program multiplexing function (a plurality of programs are multiplexed into a single multiplexed stream). The TS decoder 43d transfers video data and audio data, which have been encoded in a given coding method (for example, MPEG2: Moving Picture Experts Group phase 2), to the video/audio decoder 43e. Further, the TS decoder 43d sends a variety of information such as control information to the controller 43a.

The video/audio decoder 43e decodes the video and audio data that have been encoded in the given format, and sends the decoded data to a monitor with a speaker.

The character display unit 43f generates character images based on character information sent from the controller 43a, and outputs the character images to the monitor. That is, the individual message is extracted from the EMM separated from the broadcasting signal by the controller 43a. If the received program is subject to view restriction, the individual message is passed to the character display unit 43f. Then, image data forming the individual message is output to the monitor instead of video data that is output by the video/audio decoder 43e.

The key input unit 43g receives a signal, such as infrared rays, from a remote controller 45, and transfers the received signal to the controller 43a. The remote controller 45 is an input device equipped with character keys and arrow keys. A signal of the key depressed is sent to the key input unit 43g. The viewer uses the remote controller 45 to choose the view restricted program and set the rating value of the parental lock and enter the password.

The telephone modem 43h connects the receiver 43 to another device (for example, the view restriction setting device 61 of the viewer protection business unit 60) via the public line in accordance with an instruction from the controller 43a. The telephone modem 43h converts the digital signal that is output by the controller 43a into a corresponding analog signal, which is then output to the device connected via the public line.

The IC card 44 may be connected to the controller 43a. The IC card 44 stores information such as the master key inherent in the individual viewer. The controller 43a reads information from the IC card 44, and controls the receiver 43 such as the program view restriction.

Figure 6:
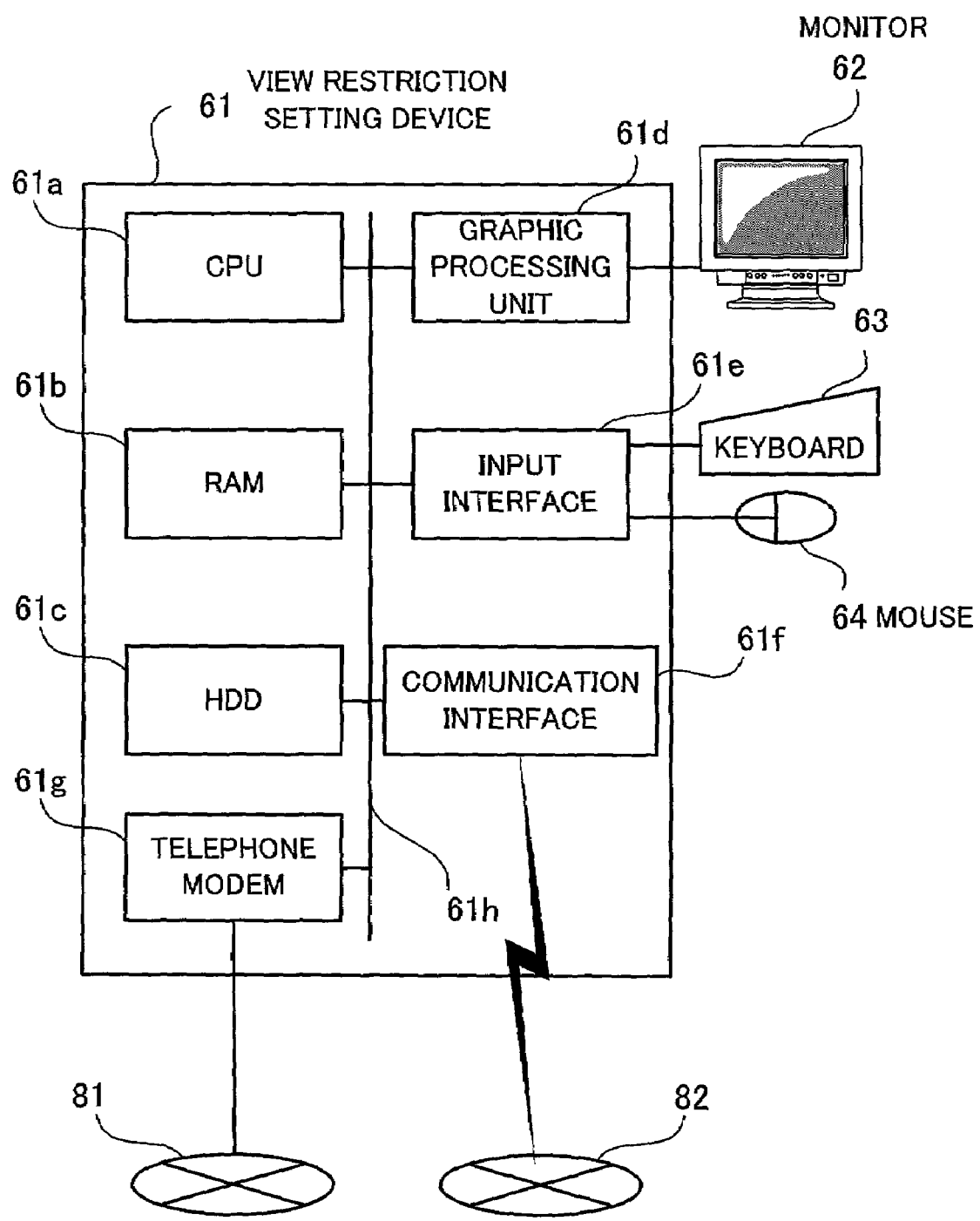
FIG. 6 is a diagram of a hardware structure of a view restriction setting device installed in a viewer protection business unit.

FIG. 6 is a block diagram of a hardware structure of the view restriction setting device installed in the viewer protection business unit. The view restriction setting device 61 is totally controlled by a CPU (Central Processing Unit) 61a, to which are connected a RAM (Random Access Memory) 61b, a HDD (Hard Disc Drive) 61c, a graphic processing unit 61d, an input interface 61e, a communication interface 61f, and a telephone modem 61g via a bus 61h.

A part of an OS (Operating System) program and an application program is temporarily stored in the RAM 61b. Further, various data necessary for processing by the CPU 61*a* is temporarily stored in the RAM 61*b*. The OS and the application program are stored in the HDD 61*c*.

A monitor 62 is connected to the graphic processing device 61*d*, which displays images on the monitor 62 in accordance with an instruction from the CPU 61*a*. A keyboard 63 and a mouse 64 are connected to the input interface 61*e*, which transfers signals from the keyboard 63 and the mouse 64 to the CPU 61*a* via the bus 61*h*.

The communication interface 61*f* is connected to the network 82. The communication interface 61*f* sends and receives data to and from other computers. The telephone modem 61*g*, which is connected to the network 81, sends and receives data to and from the receiver 43 via the network 81.

The view restriction setting device 61 of the viewer protection business unit 60 employs the hardware structure shown in FIG. 6 to realize the following processing functions.

Figure 7:
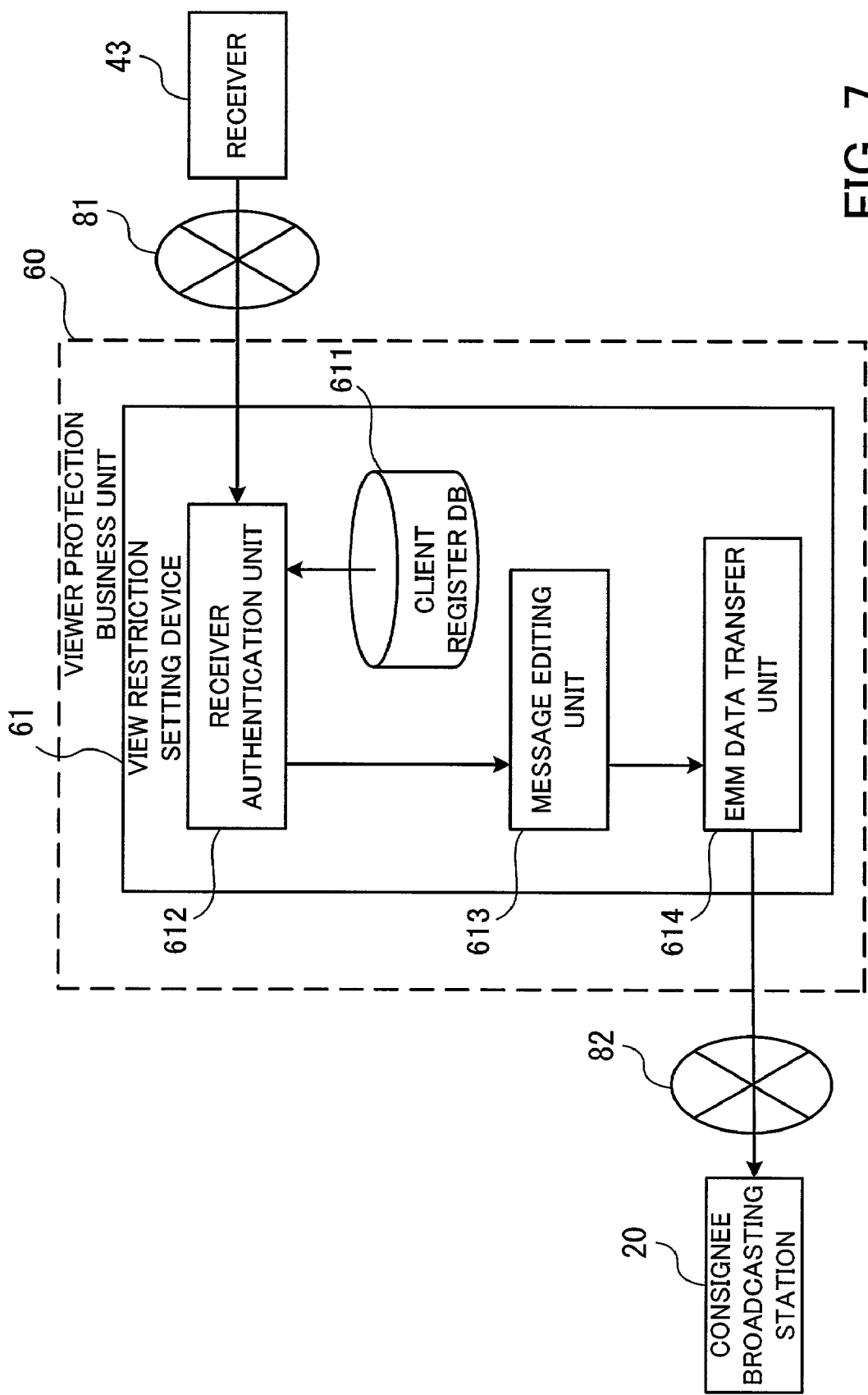
FIG. 7 is a functional block diagram illustrating functions realized by the view restriction setting device of the viewer protection business unit.

FIG. 7 is a block diagram of functions realized by the view restriction setting device 61 installed in the viewer protection business unit 60. The device 61 is made up of a client register database (DB) 611, a receiver authentication unit 612, a message editing unit 613, and an EMM data transfer unit 614.

The client register database 611 memorizes client information about viewers (clients) with whom the viewer protection business unit 60 makes a contract for providing service. The client information contains items of information such as the name of each client, ID of the receiver 43, password and payment way (for example, the bank account for charge).

The receiver authentication unit 612 receives access from the receiver 43 and collates the ID sent therefrom with the registered IDs stored in the client register database 611. If the corresponding ID pair is stored in the client register database 611, the receiver authentication unit 612 authenticates the receiver 43 and maintains the communication with the receiver 43. From now on, the receiver authentication unit 612 sends the message editing unit 613 individual view restriction information (information such as a message) sent by the authenticated receiver 43. Authentication of the client may need to enter the password. In this case, the set of the ID and password of the receiver 43 is memorized in the client register database 611.

The message editing unit 613 edits character information (such as a character code) sent from the receiver authentication unit 612 so as to add message identifying information thereto, an individual message being thus created. Further, the message editing unit 613 receives, from the receiver 43 via the receiver authentication unit 612, information for designating a program (information about program subject to restriction) on which view restriction should be imposed, and associates it with the ID of the receiver 43. Then, the message editing unit 613 adds the individual message to the ID of the receiver 43 and the information about the program subject to restriction. The message editing unit 613 passes the individual message added to the information about the restricted program to the EMM data transfer unit 614 as EMM data.

The EMM data transfer unit 614 sends the EMM data and the ID of the receiver 43 sent from the message editing unit 613 to the consignee broadcasting station 20 via the network 82.

View restriction processing executed on the above-mentioned system will be described below. In the following description, a flow of the processing will be described briefly, and then a data structure will be described in detail.

Figure 8:
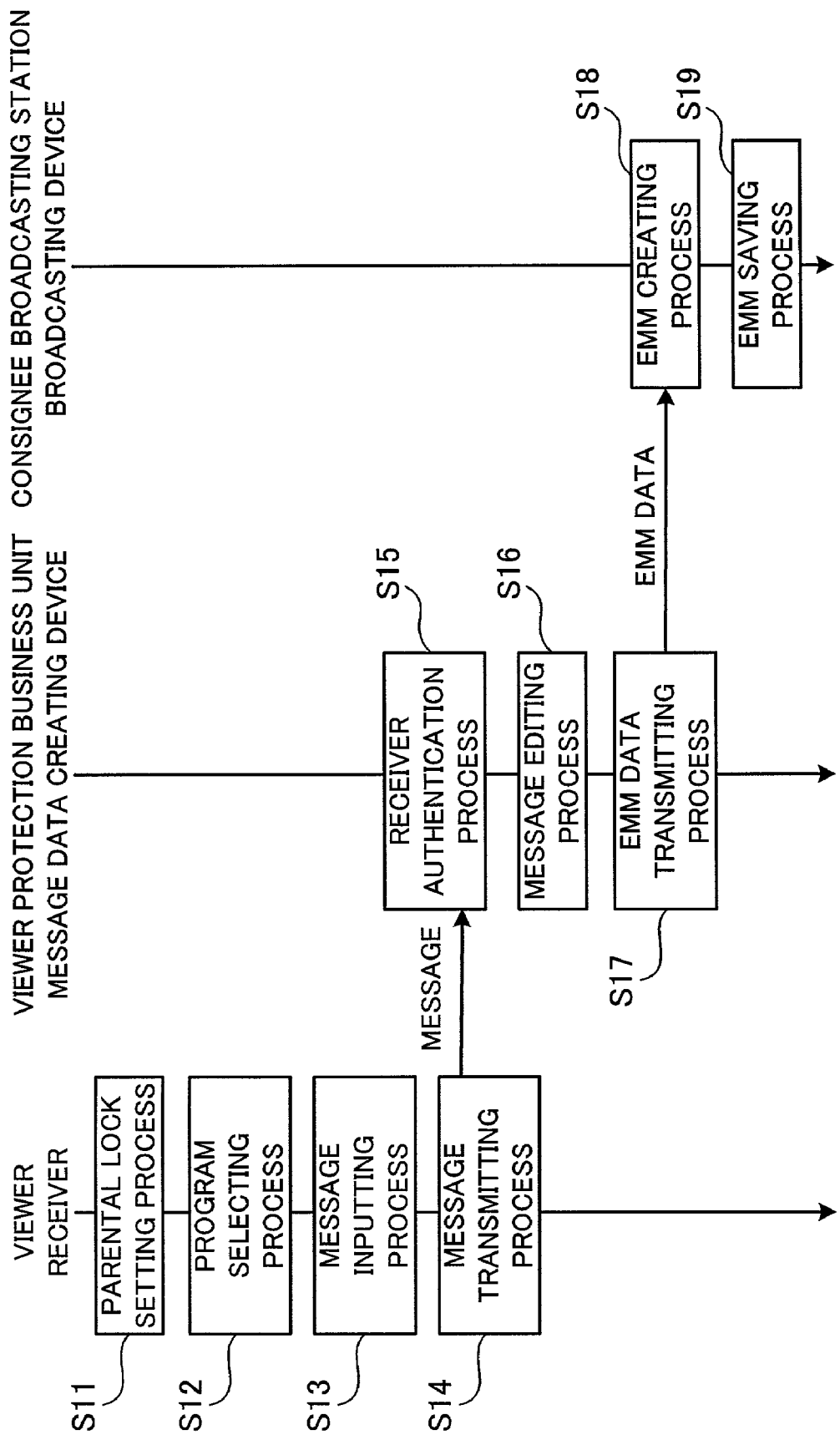
FIG. 8 is a sequence diagram of processing at the time of view restriction.

FIG. 8 is a sequence diagram of processing performed at the time of setting the view restriction. First, the viewer 40 sets the parental lock in the receiver 43 at home (step S11). More particularly, the viewer 40 sets the parental password in the receiver 43. Further, the viewer 40 sets the program rating for view blocking. For instance, the viewer 40 sets the threshold rating value in the receiver 43.

Furthermore, the viewer 40 uses the receiver 43 for a program selecting process for voluntarily designating a program subject to view restriction (step S12). More particularly, the viewer 40 uses the receiver 43 to acquire all-stations EPG from the server computer 71 of the SI collection/delivery center 70. The receiver 43 displays a list of programs that are scheduled to be broadcasted by the consignee broadcasting stations 20, 21, . . . on the basis of the all-stations EPG. The viewer 40 sees the all-stations EPG displayed on the receiver 43, and chooses a program to be blocked on the basis of information about scheduled programs in each channel (the contents of the programs are briefly described.

Further, the viewer 40 inputs the message that is to be automatically displayed at the time of view to the receiver 43 (step S13). The input message is sent to the view restriction setting device 61 of the viewer protection business unit 60 together with the information specifying the receiver 43 of the viewer 40 and information specifying the chosen program (information about the program to be restricted) (step S14).

The view restriction setting device 61 receives an access from the receiver 43 and authenticates the receiver 43 of the viewer 40 for tamperproof (step S15). In the authentication, the ID (receiver identification information) and password of the receiver 43 may be used. The receiver 43 accepts the entry of the password, and sends the ID and password of the receiver 43 to the view restriction setting device 61. If the set of the ID and password coincides with one of the registered sets, the view restriction setting device 61 authenticates the receiver 43 and receives the message.

The device 61 receives the message and edits it (step S16). More particularly, the view restriction setting device 61 adds the message ID to the message to create EMM data. Further, the device 61 associates the ID of the receiver 43 with the view-restricted program information in the message. Furthermore, the view restriction setting device 61 specifies the broadcasting station that schedules the selected program (here it is assumed that the consignee station 20 is specified). The specified information is sent to the broadcasting device 20*b* of the involved consignee broadcasting station 20 (step S17).

The broadcasting device 20*b* creates EMM (information conformable to the format prescribed in the EMM) on the basis of EMM data sent to the broadcasting device 20*b* from the view restriction setting device 61 (step S18). The EMM thus created is saved in the broadcasting device 20*b* in correspondence with the designated program until the broadcasting time of the program on which the EMM should be superposed (step S19).

Figure 9:
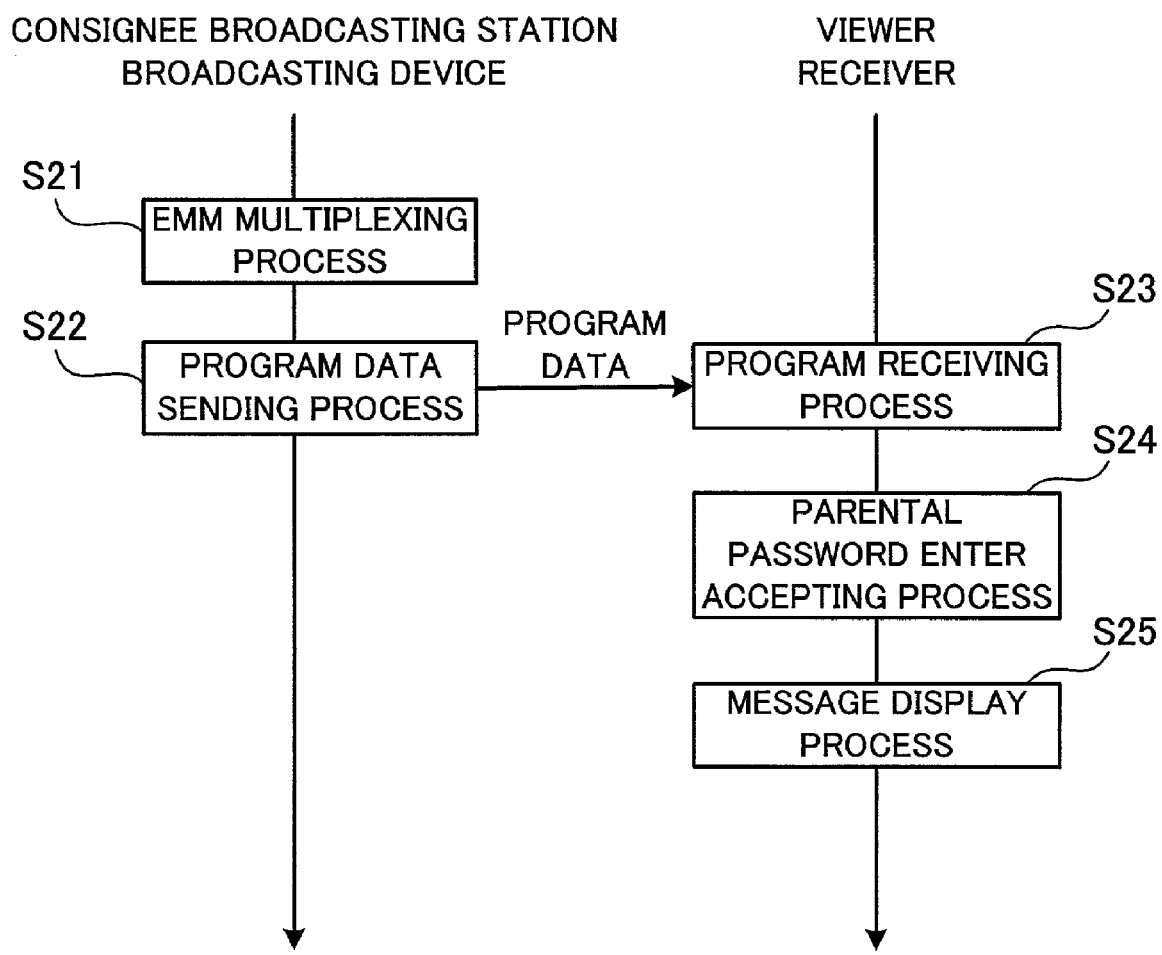
FIG. 9 is a sequence diagram of processing at the time of viewing a program.

FIG. 9 is a sequence diagram of processing at the time of viewing the program. The sequence in FIG. 9 is carried out when the parental lock is released by the correct password and the view of the program is restricted by the view restriction voluntarily designated by the viewer 40.

At the time of broadcasting the program data, the broadcasting device 20*b* of the consignee broadcasting station 20 multiplexes the retained EMM in correspondence with the program into the program data (step S21). The broadcasting device 20*b* sends the viewer 40 the program data with the EMM being multiplexed via the trustee broadcasting station 30 in the form of broadcasting wave (step S22).

The receiver 43 of the viewer 40 receives the program data via the antenna 42 (step S23). At that time, the receiver 43 admits entering the parental password from the viewer 40 if the program data has a rating value equal to or higher than the threshold rating value (step S24). As described above, the display of the highly rated program needs entry of the parental password, and the program can be viewed only when the correct parental password is entered. In this manner, view of programs having rating values equal to or higher than the threshold value are locked by the parental password.

If it is judged that the parental password is connect, the receiver 43 determines whether the voluntarily designated view restriction has been given. If the answer is affirmative, the receiver 43 displays the message contained in the EMM on the monitor (step S25). Thus, the view of the program is kept locked even if the parental lock is released.

For example, the father can voluntarily designate, at home, a program with a rating value subject to the parental lock due to an educational reason for his son in order to block the program from view. In this case, when the automatically displayed individual message has been edited, it is displayed even when the son who has acquired the parental password attempts to view the program and enters the correct parental password in the absence of his father. Thus, the son cannot view the program.

Next, a description will be given of the view restriction method of superposing program-designated information on the program subject to the view restriction and the message to be displayed on the EMM.

Pre-Operation at the Receiver

Parental Lock Setting Process (Step S11)

The viewer 40 sets, on a setting screen realized by the standard function, the rating value (age-based rating) of the program subject to the parental lock and the parental password in the receiver 43. This causes the receiver 43 to compare the rating value set by the viewer with a value set in an age-based rating item in a parental rating descriptor on a table called PMT (Program Mapping Table) included in the SI (Service Information) at the time of receiving broadcasting. If the rating value set by the viewer 40 is higher than the value in the parental rating descriptor, the program is displayed at the receiver 43. In contrast, if the value in the descriptor is equal to or higher than the rating value set by the viewer 40, the receiver 43 asks the viewer 40 to enter the parental password. The receiver 43 displays the program only when the correct parental password is entered.

Program Selecting Process (Step S12)

The viewer 40 causes the all-stations EPG to be displayed on the screen of the receiver 43. The viewer 40 confirms the content of the program description, and selects the program to be blocked by operating the input device such as a remote controller. The receiver 43 acquires necessary data in the all-stations EPG data related to the selected program in order to identify the program, and stores it in the buffer. The data thus acquired is data shown in FIG. 10 among the SI used in the all-stations EPG.

FIG. 10 illustrates information about a program subject to restriction acquired by the program selecting process. The table of FIG. 10 shows data item of data to be acquired and the acquisition source thereof as information about the program subject to restriction 111 acquired by the program selecting process.

The acquired data is a stream identification descriptor, a network name descriptor, a system management descriptor, a service list descriptor, a satellite distribution system descriptor, a service descriptor, a broadcaster name descriptor, a rectangular event descriptor, a component descriptor, and an audio component descriptor. The acquisition source of each item of data is all-stations EPG data (SI).

The stream identification descriptor is a description for identifying the data stream of the component (program). The network name descriptor is a description for identifying the network name of broadcasting. The system management descriptor is a description indicative of broadcasting/non-broadcasting. The service list descriptor is a description of a list of the draw-up channel and its identification information. The satellite distribution system descriptor is a description representing the physical condition of the satellite transmission path. The service descriptor is a description of the name of the draw-up channel and the name of its organizer. The broadcaster name descriptor is a description of the name of the broadcaster. The rectangular event descriptor is a description of the program name and a brief explanation of the program. The component descriptor is a description of the category and explanation of the video component. The audio component descriptor is a description of parameters related to the audio component.

The information about the designated program is stored in the buffer of the receiver 43.

Message Inputting Process (Step S13)

The viewer 40 creates a message to be displayed at the time of receiving the program selected at step S12 by using the input device of the receiver 43 such as the remote controller 45. The receiver 43 associates the message with data for designating the selected program stored in the buffer at step S12 and stores it in the buffer.

The viewer 40 may create the message by using a fixed form such as a telegram or an unfixed form or editing a sample message. The currently used EMM individual messages are composed of several fixed-form messages, difference format with respect thereto, and difference information. Therefore, the message editing using the fixed-form messages is here employed. However, the fixed-form messages include a message having no character and difference information on that message can be used to edit a unfixed-form message. Therefore, the message inputting process is performed by two sequences shown in FIG. 11.

Figure 11:
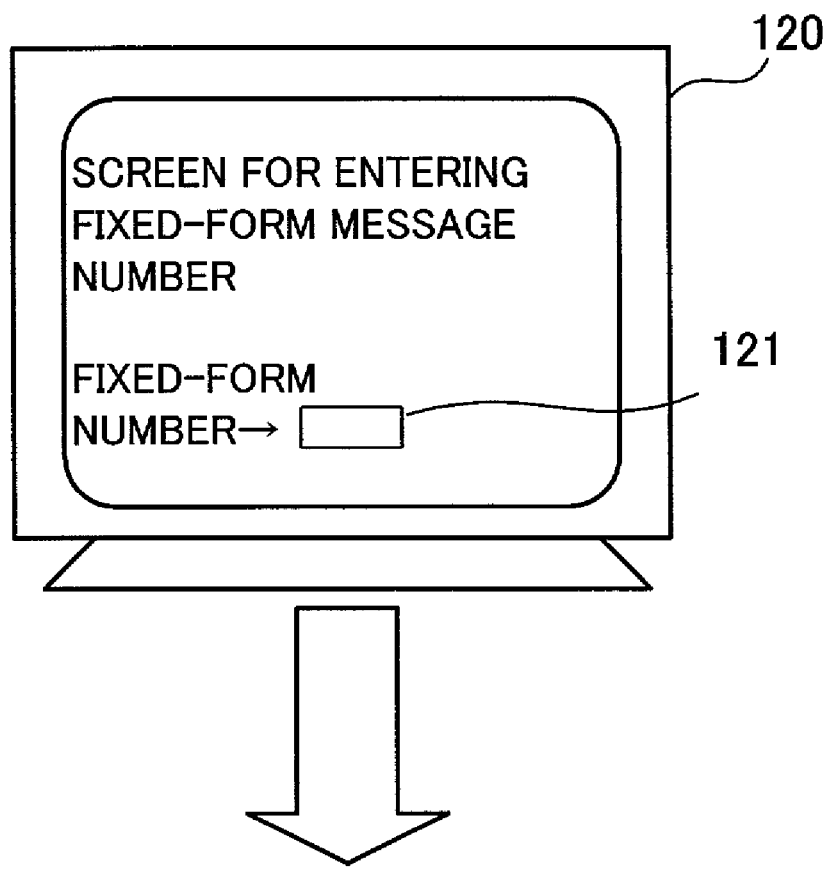
FIG. 11 is a view of a screen transition in a message enter process, wherein part (A) shows a screen on which a fixed-form message can be entered, and part (B) shows a screen on which difference information can be entered.
Figure 11:
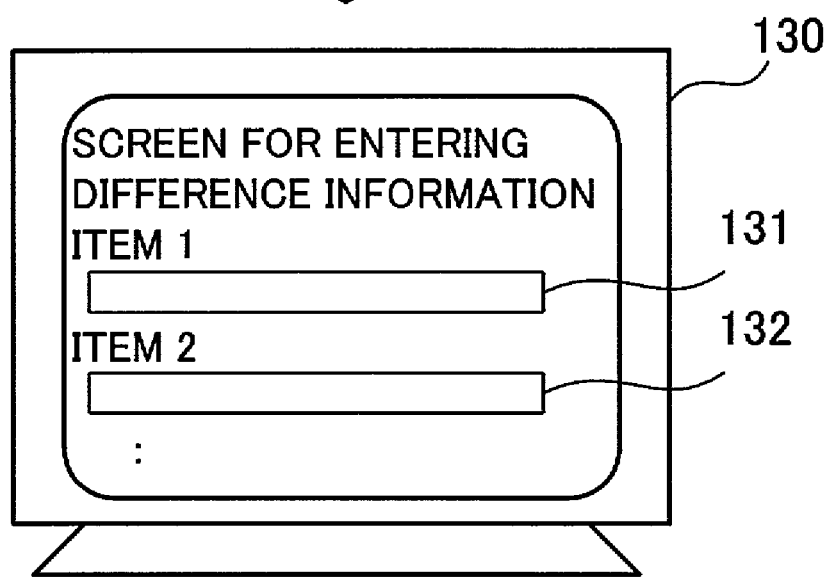

FIG. 11 is a view of an example of screen transition in the message inputting process. Part (A) of FIG. 11 illustrates a screen on which a fixed-form message number can be entered. Part (B) of FIG. 11 illustrates a screen on which difference information can be entered.

The fixed-form message number is entered so that it is entered in a fixed-form message number input area 121 on a fixed-form message number input screen 120 by using the input device such as the remote controller 45 (there is a fixed-form message having no characters).

The difference information input is entered so that the viewer 40 selects items 131 and 132 that can be changed in the fixed-form message selected on a difference information input screen 130 and a phrase or sentence is input using the input device such as the remote controller 45.

The content of each fixed-form message and a changeable part are displayed in the process of selecting the fixed-form number or the viewer protection business unit 60 notifies the viewer 40 of these items of information in advance. When the content of each fixed-form message and a changeable part is displayed, the viewer 40 uses the receiver 43 to access the view restriction setting device 61 of the viewer protection business unit 60 and get a list that defines the correspondence between the content of the fixed-form message (a changeable part is indicated) and the number of the fixed-form message. The receiver 43 displays the acquired list on the monitor. In order that the viewer protection business unit 60 notifies the viewer 40 of these items of information in advance, the business unit 60 sends a document of the correspondence list to the viewer 40 by mail.

Message Transmitting Process (Step S14)

The receiver 43 acquires data for specifying the receiver 43 from the IC card 44 in which the ID of the receiver 43 is stored. The receiver 43 combines the acquired data with the message and information about the program subject to view restriction stored in its own buffer to thereby generate individual view restriction information. Then, the receiver 43 sends the information thus created to the view restriction setting device 61 of the viewer protection business unit 60. The data sent to the viewer protection business unit 60 from the receiver 43 is as shown in FIG. 12. The called destination number form establishing a connection with the viewer protection business unit 60 is stored in the receiver 43.

FIG. 12 is a view of an example of the individual view restriction information sent to the viewer protection business unit from the receiver. More particularly, FIG. 12 shows items of data of individual view restriction information 112 and their sources. The individual view restriction information 112 sent to the viewer protection business unit 60 from the receiver 43 includes a IC card ID of the receiver, the stream identification descriptor, the network name descriptor, the system management descriptor, the service list descriptor, the satellite distribution system descriptor, the service descriptor, the broadcaster name descriptor, the rectangular event descriptor, the component descriptor, the audio component descriptor, a fixed-form message number, and message difference information.

The IC card ID of the receiver is identification information stored in the IC card 44 loaded to the receiver 43, and is acquired from the IC card 44. The stream identification descriptor, the network name descriptor, the system management descriptor, the service list descriptor, the satellite distribution system descriptor, the service descriptor, the broadcaster name descriptor, the rectangular event descriptor, the component descriptor, and the audio component descriptor have been described with reference to FIG. 10. The fixed-form message number is selectively entered on the fixed-form message number input screen 120. The message difference information is a phrase or sentence that is input in the changeable part of the fixed-form message on the difference information input screen 130.

(Processing in the Viewer Protection Business Unit)

Receiver Authentication Process (Step S15)

In the viewer protection business unit 60, the receiver authentication unit 612 of the view restriction setting device 61 accepts the individual view restriction information 112 sent from the receiver 43 at step S14, and collates the ID sent therefrom with the registered IDs stored in the client register database 611 in order to judge whether the viewer is legally authorized. If the IC card ID is not true, the receiver authentication unit 612 outputs error.

Message Editing Process (Step S16)

The message editing unit 613 edits the accepted data (data shown in FIG. 12). More particularly, the message editing unit 613 specifies the involved consignee broadcasting service provider (pay business unit) from among the all-stations EPG data on the individual view restriction information 112 sent to the viewer protection business unit 60 from the receiver 43. Further, the message editing unit 613 assigns message ID to the input message.

The EMM has an identifier that is unique with "pay business unit identification +message ID" as an identifier issued by the pay business unit and assigned to the message. Therefore, the message editing unit 613 assigns the message ID sent from the receiver 43 a number that is not the same as any of the message IDs issued by the involved pay business unit.

FIG. 13 is a view of an example of the EMM data. In FIG. 13, there are illustrated a data item, content and size (byte) of the EMM data 113. Examples of the EMM data 113 are the card ID, a pay business unit identification code, message ID, fixed-form message number and message difference information.

The card ID is the one of the IC card loaded to the receiver 43, and its data size is equal to 6 bytes. The card ID identifies the receiver 43. That is, the card ID plays a role of receiver identification information. The pay business unit identification code acts to identify the business unit on the pay broadcasting operation, and has a data size of 1 byte. The message ID is identification information allotted to the message, and has a data size of 1 byte. The fixed-form message number identifies the selected fixed-form message, and has a data size of 2 bytes. The message difference information is a phrase or sentence that is input in the changeable part of the fixed-form message, and has a data size of N bytes (N is a natural number equal to or greater than 1).

EMM Data Transmitting Process (Step S17)

The view restriction setting device 61 of the viewer protection business unit 60 associates the EMM data edited as shown in FIG. 13 and program designating data (information about the program subject to view restriction), and transfers the combined data to each pay broadcasting service provider.

FIG. 14 is a view of an example of the program designating data. The content of the program designating data is the same as that of the information about the program subject to restriction 111 shown in FIG. 10.

(Process in Consignee Broadcasting Station (Broadcasting Service Provider))

EMM Common Message Creating Process

The consignee broadcasting station 20 designates the program selected by the viewer from the program designating data received from the view restriction setting device 61 of the viewer protection business unit 60, and creates, from the EMM data, EMM individual message that acts as service information (SI) of the selected program and EMM common message.

FIG. 15 is a view of an example of the EMM individual message, and shows a data item, the content and data size (byte) of EMM individual message 115. The EMM individual message 115 includes the card ID, message byte length, protocol number, pay business unit identification code, message ID, message control information, tamper-proof check or spare, expiration date or spare, fixed-form message number, difference format number, difference information length, difference information, and a stuffing bit. In a message code field, the tamper-proof check or spare, expiration date or spare, fixed-form message, difference format number, difference information length, difference information and stuffing bit are stored.

The card ID is the ID of the IC card 44 loaded to the receiver 43, and has a data size of 6 bytes. The message byte length indicates the byte length from the protocol number to the last of the message code field, and has a data size of 2 bytes. The protocol number is a value indicating protocol other than 0xFF (no encrypting), and has a data size of 1 byte. The pay business unit identification code is a code for identifying the business unit on the pay broadcasting operation, and has a data byte of 1 byte. The message ID identifies the selected message and has a data size of 1 byte. The message control information indicates the location of the message, and is assigned 0x01(which denotes "memorized in IC card"), and has a data size of 1 byte.

The tamper-proof check or spare information specifies a byte stream for tamper check, and has a data size of 2 bytes. The expiration date or spare information indicates the end date of program, and has a data size of 2 bytes. The fixed-form message number indicates the selected fixed-form message, and has a data size of 2 bytes. The difference format number is a description format number of difference information and indicates to which type of the predetermined format the difference information belongs, and has a data size of 1 byte. The difference information length indicates the byte length of the difference information, and has a data size of 2 bytes. The difference information is the content of the message difference information, and has a data size of N bytes. The stuffing bit indicates whether the information in the message code field is valid or invalid, and has a data size of M bytes (M is a natural number equal to or greater than 1).

FIG. 16 is a view of an example of the EMM common message. FIG. 16 shows a data item, content and data size (byte) of the EMM common message 116. The EMM common message 116 includes the pay business unit identification code, automatic display deletion type, automatic display continuous time 1, automatic display continuous time 2, automatic display continuous time 3, automatic display times, format number, message length and a message code body.

The pay business unit identification code identifies the business unit on the pay broadcasting operation, and has a data size of 1 byte. The automatic display deletion type is information indicating whether deletion of automatically displayed information is allowed, and has a data size of 1 byte. For example, 0x01(="deletion is not allowed" is assigned to a message of a fee payment reminder. The continuous time of automatic display is set in the "automatic display continuous time 1", which has a data size of 1 byte. If the automatic display does not have any time limit, 0xFF (no time limit) is set in the automatic display continuous time 1. The continuous time of automatic display may be set in the "automatic display continuous time 2", which has a data size of 1 byte. The continuous time of automatic display may be set in the "automatic display continuous time 3", which has a data size of 1 byte. The automatic display times indicates how many times automatic display should be performed. For example, when the automatic display continuous time 1 has no time limit, "1" is set in the automatic display times, which has a data size of 1 byte. The format number is information indicating the format type of the message code body, and has a data size of 1 byte. The message length is the byte length of the message code of the common message, and has a data size of 2 bytes. The message code body is the content of the common message, in which the fixed-form message is set. The message code body has a data size of L bytes (L is a natural number equal to or greater than 1).

The EMM thus created is stored in the broadcasting device 20b of the consignee broadcasting station 20 (step S19). When the time of broadcasting the program comes, the stored EMM is multiplexed into the program data (step S21), and is transmitted (step S22). In the transmission process, an EMM message section, an EMM section and the service information (SI) necessary for drawing up the program are created by using the EMM individual message 115 shown in FIG. 15 and the EMM common message 116 shown in FIG. 16 in accordance with the regulations of creating the service information (SI). In this manner, the program is created and is transmitted on the date for broadcasting.

(Process at the Time of Receiving)

At the time of receiving a program, a program receiving process (step S23), a parental password enter accepting process (step S24), and a message display process (step S25) are performed.

Figure 17:
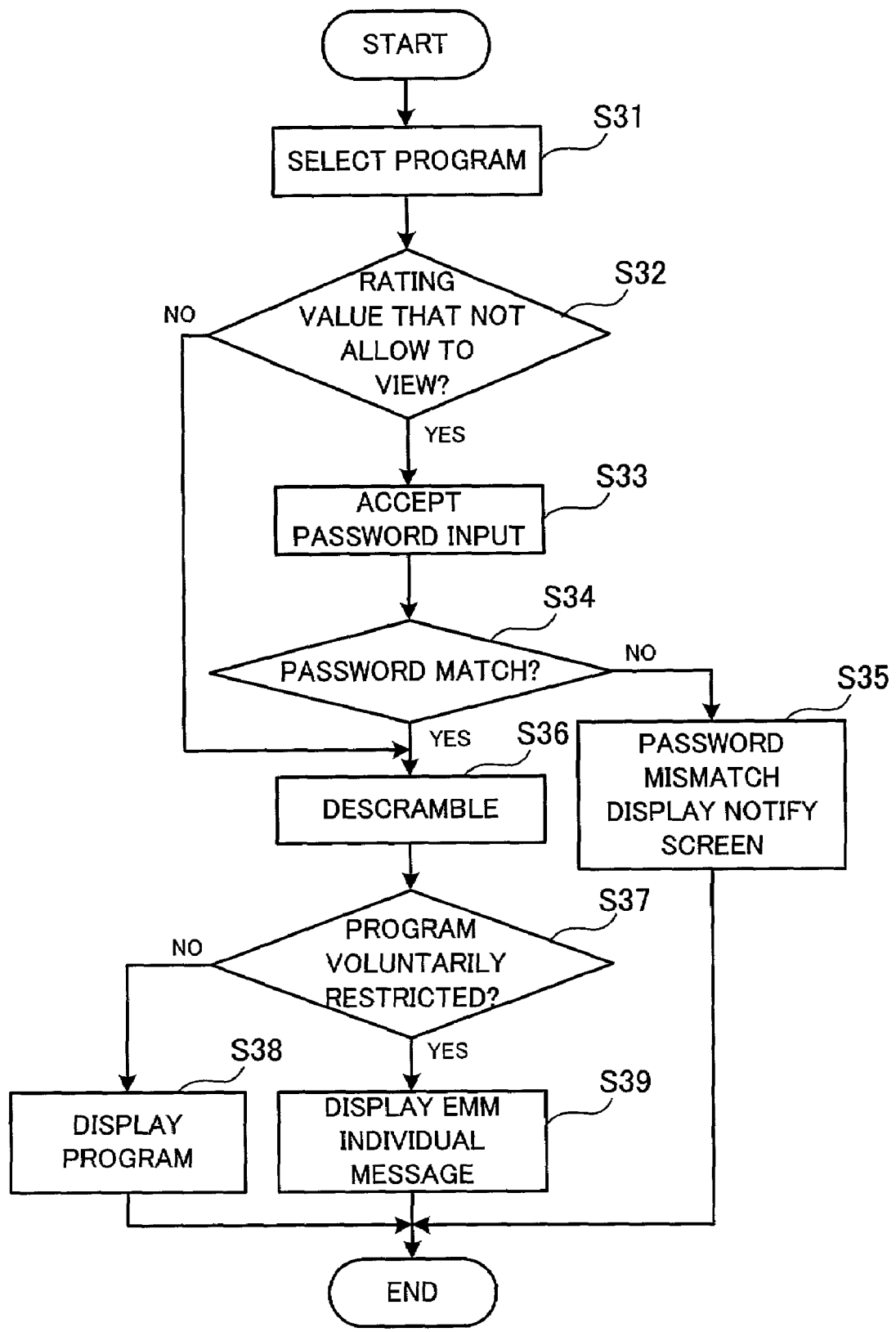
FIG. 17 is a flowchart of processing sequence executed at the receiver at the time of receiving a program.

FIG. 17 is a flowchart of a processing sequence of the receiver at the time of receiving a program. This process is described with reference to step numbers shown in FIG. 17.

At step S31, the receiver 43 accepts an operation of selecting a program that the viewer wishes to see. When the viewer 40 tunes the corresponding channel, the receiver 43 receives a program association table (PAT), a network information table (NIT), a conditional access table (CAT), a program map table (PMT), EMM and ECM included in the service information (SI) of the program.

At step S32, the receiver 43 determines whether the rating of the received program does not allow the program to be viewed. If the rating of the received program does not allow the program to be viewed, the process proceeds to step S33. Otherwise, the process proceeds to step S36.

At step S33, the receiver 43 displays the screen for entering the parental password, and accepts the parental password.

At step S34, the receiver 43 determines whether the input password matches the parental password that is registered in advance. If the input password matches the registered one, the process proceeds to step S36. If not, the process proceeds to step S35.

At step S35, the receiver 43 makes a message screen on which password mismatch is displayed. Then, the process ends.

At step S36, the receiver 43 descrambles the received program.

At step S37, the receiver 43 determines whether the received program is the program that is voluntarily restricted. For example, if a voluntary specified message is included as the EMM individual message 115, it is determined that the received program is the program that is voluntarily restricted. Then the process proceeds to step S39. Otherwise, the process proceeds to step S38.

At step S38, the receiver 43 displays the received program and ends the process.

At step S39, the receiver 43 displays the EMM individual message 115 on the whole screen, and ends the process.

As mentioned above, when the viewer 40 selects the voluntarily restricted program, the EMM individual message 115 is displayed on the whole screen instead of the screen of the program.

As described above, according to the embodiments of the present invention, it is possible to not only rate the broadcasting service providers but also determine whether the view of the TV program is allowed on the basis of the individual standard at home. Thus, it is possible to impose the view restriction on even the program that is recognized viewable to children by the broadcasting service provider.

Even if the parental password set at the receiver is brought to the knowledge of the child and is released, the automatic display message appears on the whole screen in order to block the program from view. This double blocking enables sure view restriction.

In the time range of the program on which the view restriction is voluntarily imposed by the viewer, the automatic display message that is voluntarily set by the viewer appears on the channel of the program. Therefore, the viewer may think out a message from educational viewpoints. This would additionally bring about the educational effects.

In the above-mentioned example, the viewer protection business unit, which is the third party organization, creates the EMM data. Alternatively, the broadcasting service provider (such as any of the consignee broadcasting stations 20, 21, . . . , and a terrestrial broadcasting service provider) may be involved in creating the EMM data. Also, the receiver 43 creates EMM data, which is transmitted directly to the broadcasting service provider.

The above processing function may be implemented by a computer. In this case, a program is provided that describes the processing contents of the functions of the view restriction setting device and the receiver. The program is executed by the computer to realize the processing functions on the computer. The program that describes the contents of processing may be memorized in a computer readable recording medium. Examples of such a recording medium are a magnetic disc drive, an optical disc, a magneto-optical recording medium, and a semiconductor memory. The magnetic disc drive may be a hard disc drive (HDD), a flexible disc (FD) or a magnetic tape. The optical disc may be a DVD (Digital Versatile Disc), DVD-RAM (Random Access Memory), CD-ROM (Compact Disc Read Only Memory), CD-R (Recordable)/RW (ReWritable). The magneto-optical recording medium may be an MO (Magneto-Optical disc).

The program may be placed and sold in the market in the form of a portable recording medium such as DVD or CD-ROM. The program may be stored in a storage device of a server computer, and is downloaded to other computers via a network.

The computer that executes the program stores, in its storage device, the program stored in a portable recording medium or downloaded from the server computer. Then, the computer reads the program from its own storage device, and executes a process in accordance with the program. The computer may read the program directly from the portable recording medium, and execute a process in accordance with the directly read program. The computer may execute the process instructed by the program each time the computer receives the program from the server computer.

As described above, according to the present invention, the view restriction information including the receiver identification information is broadcasted together with the program voluntarily designated by the viewer. The receiver in which its own receiver identification information is set imposes the view restriction on the restricted program. Therefore, it is possible to block, at the receiver of the viewer, the program voluntarily designated by the viewer from view. In addition, since the setting of view restriction is broadcasted together with the program, the view restriction cannot be released with ease.

The foregoing is considered as illustrate only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A view restriction method for imposing view restriction on a program that is scheduled to be broadcasted or being broadcasted, the method comprising:

associating receiver identification information for identifying a receiver of a viewer with a restricted program when the restricted program is designated by the viewer;

broadcasting view restriction information including the receiver identification information associated with the restricted program together with the restricted program in a broadcasting time range of the restricted program, wherein the view restriction information includes an individual message that is voluntarily specified by the viewer;

broadcasting a rating value based on a content of the restricted program in association with the restricted program;

acquiring, at the receiver, the view restriction information broadcasted together with the restricted program;

restricting, at the receiver, display of the restricted program if the receiver identification information included in the view restriction information matches that set at the receiver;

displaying, at the receiver, a password enter screen when the restricted program has the rating value equal to or greater than a predetermined rating value; and displaying, at the receiver, the individual message included in the view restriction information instead of a screen of the restricted program, at the time of restriction of displaying the restricted program, in response to a predetermined password being entered.

\* \* \* \* \*